United States Patent Office 3,345,739
Patented Oct. 10, 1967

3,345,739
METHOD OF PRODUCING Nb-Zr WIRE BY DOUBLE VACUUM MELTING AND HEAT-TREATING
George D. Kneip, Jr., Concord, Mass., assignor to National Research Corporation, Cambridge, Mass., a corporation of Massachusetts
No Drawing. Filed Feb. 18, 1965, Ser. No. 433,770
1 Claim. (Cl. 29—528)

This invention relates to alloys and more particularly to the production of alloy wires possessing desirable superconducting properties.

A principal object of the present invention is to provide alloy wires comprising, by weight, from about 20 to 50% zirconium and the balance niobium which possess very desirable superconducting properties.

Another object of the invention is to provide a method for producing the above superconducting alloy wires.

Other objects of the invention will in part be obvious and will in part appear hereinafter.

For a fuller understanding of the nature and objects of the invention, reference should be had to the following detailed description.

In recent years considerable effort has been directed to the development of superconducting materials and the use thereof in various devices, such as, for example, superconducting solenoids. Most contemplated uses of superconducting materials require the flow of large currents and many require the creation of magnetic fields of some magnitude. Moreover, most of the contemplated superconducting devices require the use of superconducting material in the form of a fine wire or ribbon. For example, the superconducting wire may be of a diameter of about 15 mils or less. In such devices, the wire or ribbon may take the form of single or multiple straight strands, or for many magnetic applications may be wound to assume the form of one or more coils, as in a solenoid.

Superconducting wires formed of an alloy comprising, by weight, from about 20 to about 50% zirconium and the balance niobium are well known. Alloy wires containing between about 25 to 33% zirconium have been found to be particularly useful in superconducting devices.

It has been found that wires comprising a niobium and zirconium alloy such as noted above can be produced which possess excellent superconducting properties. It has also been found that such properties can be consistently reproduced in the alloy wires. Briefly, the improved superconducting wires of the present invention are produced by suitably reducing a bar or rod having a specific alloy composition and structure to a wire capable of being cold drawn and thereafter cold drawing the resulting wire in a series of steps to a predetermined diameter. The alloy ingot to be reduced to wire preferably comprises, by weight, from about 20 to 50% zirconium, the sum total of oxygen, nitrogen, carbon and hydrogen not exceeding about 0.05%, and the balance niobium, said alloy having a plurality of phases with the body-centered cubic beta phase predominating and a grain size which is predominantly between about 3 and 6 square millimeters. About 1% to 5% of the alloy ingot consists of a second phase which is distributed along the grain boundaries of the beta phase. Preferably, the sum total of the interstitial elements, oxygen, nitrogen, carbon and hydrogen ranges between about 0.03 and 0.05% with at least 50% thereof being oxygen.

The following non-limiting examples illustrate the preparation of superconducting alloy wires in accordance with the present invention and the testing of the current carrying capacities of such wires.

Example 1

A consumable electrode comprising suitable quantities of niobium and zirconium metals to form an alloy having a zirconium content on the order of about 25% by weight was arc melted in a cold mold. In one preferred embodiment, the electrode comprises a center bar of niobium metal having strips or sheets of zirconium metal welded to the sides thereof, the welds being of the alloy. The niobium center and the zirconium sides were of a size such that the electrode comprised about 0.697 pound per inch of niobium metal and about 0.231 pound per inch of zirconium metal. The electrode weight was thus about 0.928 pound per inch. Analysis of the niobium metal indicated that it contained by weight about 0.001% carbon (10 p.p.m.), 0.004% oxygen (40 p.p.m.), 0.0002% hydrogen (2 p.p.m.) and 0.003% nitrogen (30 p.p.m.). Analysis of the zirconium metal indicated that it contained by weight about 0.004% carbon (40 p.p.m.), 0.085% oxygen (850 p.p.m.), 0.0005% hydrogen (5 p.p.m.) and 0.003% nitrogen (30 p.p.m.).

The above consumable electrode was suitably mounted in a furnace provided with a cold mold. In this case, the mold was about 30 inches long and about 6 inches in diameter. The mold was suitably cooled by means of water to maintain the inner surface thereof at a temperature below the melting point of the copper wall of the mold.

After a furnace pressure of about 30 microns was established, an arc was struck between the consumable electrode and alloy chips at the bottom of the mold. The electrode was then progressively melted and the melt solidified in the mold to form an ingot. The arc which was maintained between the electrode and the ingot was controlled so that the upper surface of the ingot was kept molten. During the melting operation, the arc current was maintained between about 5800 and 6500 amperes while the voltage was maintained at between about 30 to 34 volts.

The first-melted ingot was then reduced in cross-section by being longitudinally quartered with the quarter sections being welded end to end to form a consumable electrode. This was remelted in the same furnace at about the same power level of approximately 6000 amperes. This gave a melt rate of about 300 pounds per hour. When the ingot was essentially all formed, the ingot was hot-topped by slowly reducing the arc current to 2000 amperes, this being achieved by dropping the current about 1000 amperes per minute. After about 5 minutes, when the 2000 amperes level had been reached, the arc became unstable and the power was turned off. The furnace was still under high vacuum and the top of the ingot cooled quite rapidly, the following temperature readings being taken as a function of time after turning off the power:

| Time (minutes): | Temperature (° C.) |
|---|---|
| 0 | 1930 |
| 1 | 1680 |
| 2 | 1490 |
| 3 | 1390 |
| 4 | 1290 |
| 5 | 1230 |
| 6 | 1180 |
| 7 | 1130 |
| 8 | 1080 |
| 9 | 1040 |
| 10 | 1010 |

At the end of 15 minutes, the ingot temperature was between 800° C. and 900° C. and the furnace chamber was backfilled with helium to provide a pressure of about ¼ to ¾ of an atmosphere. This provided much better heat transfer to the water-cooled mold and accelerated the cooling of the ingot. Approximately ½ hour after introduction of the helium, the ingot had reached room temperature and was removed. This resulted in an ingot predominantly body-centered cubic beta phase. About 1% to 3% of the ingot cross-section area consisted of a second phase which was distributed along the grain boundaries of the beta phase. Analysis of this ingot indicated that it comprised, by weight, about 25% zirconium, about 0.007% carbon, about 0.034% oxygen, about 0.0002% hydrogen, about 0.005% nitrogen, and the balance essentially niobium. The total content of the interstitials, oxygen, nitrogen, carbon and hydrogen, was thus about 0.046% with approximately 74% of said total being oxygen. Examination of the alloy grain structure indicated that the grain size of the beta phase was predominantly between about 3 and about 6 square millimeters.

After top and bottom portions of the alloy ingot were removed, the ingot which was now about 21 inches in length was cut into bars which were then swaged and drawn to fine wire.

The alloy wires were found to possess the following mechanical and electrical properties:

Ultimate tensile strength—250,000 p.s.i. at 20° C.
Yield strength (0.2% offset)—240,000 p.s.i. at 20° C.
Young's modulus—$17 \times 10^6$ p.s.i. at 20° C.
Electrical resistivity—40.1 michrom-cm. at 20° C., 31.3 michrom-cm. at 77° K.

Samples of the above wires were tested in the superconducting mode to determine the current carrying capacities thereof as a function of the transverse magnetic field. In these tests, a sample of wire of about 9 inches in length was mounted in hairpin fashion on a suitable holder. The ends of the wire sample were indium tinned and attached to copper leads. The mounted sample was immersed in liquid helium at atmospheric pressure (4.2° K.) and inserted axially into the center of a solenoid. The liquid helium temperature of 4.2° K. was well below the critical or transition temperature of the alloy. After an adequate cooling period to assure all parts of the sample to be at liquid helium temperature, the magnetic field level was set and the current in the sample increased approximately linearly with time. The potential across the sample was measured by a microvoltmeter. The current which produced a one microvolt signal across the superconductor wire sample was taken as the critical current at the imposed field level. The critical current measured was for the imposed field perpendicular to the current in the superconductor wire. The results of the current carrying capacity tests for the above alloy wires set forth in the following table:

| Applied magnetic field: | Minimum critical currents, amperes |
|---|---|
| 5 Kgauss | 100 |
| 10 Kgauss | 80 |
| 20 Kgauss | 60 |
| 30 Kgauss | 53 |
| 40 Kgauss | 50 |
| 50 Kgauss | 42 |
| 60 Kgauss | 23 |

*Example 2*

A consumable electrode comprising suitable quantities of niobium and zirconium metals to form an alloy having a zirconium content on the order of about 33% was arc melted in a cold mold. The electrode was made up as in the above example except, however, the niobium center and zirconium sides were of a size such that the electrode comprised about 0.697 pound per inch of niobium metal and about 0.348 pound per inch of zirconium metal. The electrode weight was thus about 1.045 pounds per inch. The analyses of the metals are set forth in the above example.

This electrode was arc melted at a furnace pressure of about 10 microns into a cold mold which was about 30 inches long and about 4 inches in diameter. During the melting operation, the arc current was maintained between 3600 and 4000 amperes while the voltage was maintained between about 30 to 34 volts.

The resulting alloy ingot was longitudinally quartered and the quarter sections welded end to end to form a consumable electrode which was arc melted as above. The cooling of the ingot was controlled in the same fashion as described in Example 1 to produce an alloy structure having a plurality of phases with the body-centered cubic beta phase predominating. Analysis of this ingot indicated that it comprised, by weight, about 33% zirconium, about 0.008% carbon (80 p.p.m.), about 0.034% oxygen (340 p.p.m.), about 0.0005% hydrogen (5 p.p.m.), about 0.005% nitrogen (50 p.p.m.), and the balance substantially niobium. The total content of the interstitials, oxygen, nitrogen, carbon and hydrogen was thus about 0.045% with approximately 72% of said total being oxygen. Examination of the alloy grain structure indicated that the grain size was predominantly between about 3 and about 6 square millimeters. This ingot also had a second phase distributed along the grain boundaries of the beta phase, the second phase being about 1% to 3% of the ingot cross-section.

Samples of the wire made from the above ingot were tested in the superconducting mode as in Example 1 to determine the current carrying capacities thereof. The results of these tests are set forth in the following table:

| Applied magnetic field: | Minimum critical current, amperes |
|---|---|
| 5 Kgauss | 110 |
| 10 Kgauss | 65 |
| 20 Kgauss | 48 |
| 30 Kgauss | 45 |
| 40 Kgauss | 43 |
| 50 Kgauss | 38 |
| 60 Kgauss | 27 |

The production of alloy wires comprising niobium and zirconium which possess highly desirable superconducting properties involves such important factors as, for example, the quantity of zirconium in the alloy, the individual and total quantity of interstitial elements as oxygen, nitrogen, carbon and hydrogen in the alloy, the phase and grain structure of the alloy, and cold working of the alloy.

The alloys of the present invention preferably contain, by weight, a sum total of oxygen, nitrogen, carbon and hydrogen not exceeding about 0.05%. Preferably, the sum total of such elements ranges between about 0.03% and 0.05%. Alloys containing less than about 0.03% while being able to be easily worked and drawn, possess poor superconducting properties. Alloys containing above about 0.05% of such interstitials, while possessing excellent superconducting properties, are extremely difficult to work and draw.

The alloy phase and grain structures are important. Improved superconducting wire is obtained when the ingot to be reduced to wire comprises an alloy having a plurality of phases with the body-centered cubic beta phase predominating, a grain size which is predominantly between about 3 and about 6 square millimeters and with a second phase distributed along the grain boundaries of the beta phase, the second phase being about 1% to 3% of the ingot cross-section.

Since certain changes may be made in the above described details without departing from the scope of the invention herein involved, it is intended that all matter contained in the description shall be interpreted as illustrative and not in a limiting sense.

What is claimed is:

A method for forming superconducting wire from an alloy of niobium and zirconium comprising, by weight, from about 20 to about 50% zirconium, the sum total of oxygen, nitrogen, carbon and hydrogen not exceeding about 0.05% of which at least 50% is oxygen, and the balance niobium, the method comprising the steps of double vacuum melting a consumable electrode of said alloy of niobium and zirconium comprising, by weight, cold mold vacuum furnace, hot-topping the resultant ingot by slowly reducing the arc power at the end of the second melting operation and thereafter allowing said ingot to cool for a few minutes under vacuum to between 800° C. and 900° C. then rapidly cooling the ingot by backfilling the vacuum furnace with an appreciable partial pressure of an inert gas to provide increased conductive heat transfer to the cold mold, thereby forming an ingot having a predominant body-centered cubic phase having a grain size between about 3 and about 6 square millimeters with about 1% to 3% of a second phase distributed along the grain boundaries of the first phase, cutting the ingot into bars and swaging and cold drawing the niobium-zirconium alloy to fine wire.

References Cited
UNITED STATES PATENTS 3,215,569  11/1965  Kneip et al. _____ 148—133
3,253,191  5/1966  Trenting et al.
3,303,065  2/1967  Reynolds _____ 148—133 X JOHN F. CAMPBELL, *Primary Examiner.*

P. M. COHEN, *Assistant Examiner.*

UNITED STATES PATENT OFFICE
CERTIFICATE OF CORRECTION

Patent No. 3,345,739                        October 10, 1967

George D. Kneip, Jr.

It is hereby certified that error appears in the above numbered patent requiring correction and that the said Letters Patent should read as corrected below.

Column 5, line 2, for "alloy of niobium and zirconium comprising, by weight," read -- alloy, the second melting being an arc melting step --; line 3, before "cold" insert -- in a --.

Signed and sealed this 29th day of October 1968.

(SEAL)
Attest:

Edward M. Fletcher, Jr.
Attesting Officer

EDWARD J. BRENNER
Commissioner of Patents